(12) United States Patent
Waldron

(10) Patent No.: US 10,378,899 B2
(45) Date of Patent: Aug. 13, 2019

(54) SYSTEMS AND METHODS FOR DETERMINING POSITION OF AN OBJECT RELATIVE TO A VEHICLE

(71) Applicant: Goodrich Corporation, Charlotte, NC (US)

(72) Inventor: Erik L. Waldron, Concord, MA (US)

(73) Assignee: Goodrich Corporation, Charlotte, NC (US)

(*) Notice: Subject to any disclaimer, the term of this patent is extended or adjusted under 35 U.S.C. 154(b) by 138 days.

(21) Appl. No.: 15/700,948

(22) Filed: Sep. 11, 2017

(65) Prior Publication Data

US 2019/0078893 A1    Mar. 14, 2019

(51) Int. Cl.
| | | |
|---|---|---|
| *G01C 21/02* | (2006.01) | |
| *G01C 21/16* | (2006.01) | |
| *G01S 3/02* | (2006.01) | |
| *G01S 3/786* | (2006.01) | |
| *G01C 11/02* | (2006.01) | |

(52) U.S. Cl.
CPC ............ *G01C 21/025* (2013.01); *G01C 11/02* (2013.01); *G01C 21/165* (2013.01); *G01S 3/023* (2013.01); *G01S 3/7867* (2013.01)

(58) Field of Classification Search
CPC .... G01C 21/025; G01C 21/165; G01C 11/02; G01S 3/023; G01S 3/7867
See application file for complete search history.

(56) References Cited

U.S. PATENT DOCUMENTS

| | | | |
|---|---|---|---|
| 8,604,966 B1 | 12/2013 | Luk-Paszyc et al. | |
| 8,837,782 B1 | 9/2014 | Rosenwinkel et al. | |
| 9,217,643 B1 | 12/2015 | Belenkii et al. | |
| 9,503,177 B1* | 11/2016 | Shi | H04B 7/18519 |
| 9,528,834 B2* | 12/2016 | Breed | B60R 21/0132 |
| 9,702,702 B1 | 7/2017 | Lane et al. | |
| 2011/0275408 A1* | 11/2011 | Kulik | G01C 17/34 |
| | | | 455/556.1 |
| 2011/0293139 A1 | 12/2011 | Ohta | |
| 2014/0278082 A1* | 9/2014 | De Vries | B64G 3/00 |
| | | | 701/519 |

(Continued)

FOREIGN PATENT DOCUMENTS

| | | |
|---|---|---|
| CN | 106595702 | 4/2017 |
| WO | WO-8601593 A1 | 3/1986 |

OTHER PUBLICATIONS

Extended European Search Report for European Patent Application No. EP18193447.2, dated Jan. 29, 2019.

(Continued)

*Primary Examiner* — Frederick M Brushaber

(74) *Attorney, Agent, or Firm* — Locke Lord LLP; Scott D. Wofsy; Judy R. Naamat

(57) ABSTRACT

A method of determining position of an object using an imaging device includes imaging a celestial object using an imaging device. A difference between an expected position of the celestial object and an actual position of the celestial object is determined. Pointing of the imaging device is in-flight calibrated to improve position determining by nulling the difference between the expected position of the celestial object and the actual position of the celestial object. Systems for determining position of an object relative to a vehicle are also described.

20 Claims, 2 Drawing Sheets

(56) References Cited

U.S. PATENT DOCUMENTS

2017/0131096 A1 5/2017 Karlov et al.

OTHER PUBLICATIONS

McIntyre, J.E. et al: "A star scan/attitude determination experiment conducted on the geostationary meteorological satellite", Acta Astronautica, vol. 7, No. 2, Feb. 1, 1980 (Feb. 1, 1980), pp. 137-154, XP055538366, GB ISSN: 0094-5765, DOI: 10.1016/0094-5765(80)90056-9.

* cited by examiner

SYSTEMS AND METHODS FOR DETERMINING POSITION OF AN OBJECT RELATIVE TO A VEHICLE

BACKGROUND OF THE INVENTION

1. Field of the Invention

The present disclosure relates to target location, and more particularly to improved target location by in-flight celestial line of sight calibration.

2. Description of Related Art

Vehicles, such as ships and aircraft, commonly have a need to acquire positional information of targets in the vehicle environment. Obtaining positional information for a given target, like an air/space-borne or terrestrial target, generally requires an understanding of orientation and position of the vehicle relative to the target. In some vehicles orientation is determined using an imaging device, which generally determines orientation with respect to the vehicle (pointing) relying on a calibration setup, generally performed on the ground in advance of flight, and combined during flight with inertial data from an inertial measurement unit, to determine pointing. Imaging devices can generally maintain acceptable pointing accuracy using ground-based calibration and inertial data to maintain pointing knowledge during flight.

Ground-based calibrations can degrade during flight. For example, the passage of time and certain operating conditions commonly encountered during flight can degrade the ground-based calibration of the imaging system. The degradation, while generally relatively small, can induce error in pointing information provided by the imaging device during flight. The error in pointing knowledge can induce error in the positional information of a target.

Such conventional methods and systems have generally been considered satisfactory for their intended purpose. However, there is still a need in the art for improved systems and methods of determining position. The present disclosure provides a solution for this need.

SUMMARY OF THE INVENTION

A method for determining position of an object relative to a vehicle includes imaging a celestial object using an imaging device. A difference between an expected position of the celestial object and an actual position of the celestial object is determined. Pointing of the imaging device is in-flight calibrated by nulling the difference to improve position determining between the expected position of the celestial object and the actual position of the celestial object.

In certain embodiments, the celestial object can be a star or a natural satellite. The celestial object can be an artificial satellite. The vehicle can be an airborne vehicle. Imaging can be done from the airborne vehicle during flight, i.e., while in-flight. The vehicle can be a terrestrial vehicle. The vehicle can be a marine vehicle. Imaging can be done from the surface of the earth. The imaging device can be responsive to incident electromagnetic radiation to image a scene. The electromagnetic radiation can be visible waveband illumination. The electromagnetic radiation can be infrared waveband illumination. The electromagnetic radiation can be within the NIR, SWIR, MWIR, and/or LWIR subdivisions of the electromagnetic spectrum.

In accordance with certain embodiments, the difference between the expected position and the actual position of the celestial object in the imaged scene can be an in-flight calibration of imaging device pointing. A non-celestial object can be imaged with the imaging device. Geographical position of a non-celestial object can be based on the in-flight calibration of the imaging device pointing. The geographical position can be associated with the non-celestial object using the imaging device pointing.

It is contemplated that the method can include receiving two or more of vehicle position, a star catalog, and a satellite ephemeris. The imaging device can alternately be in-flight calibrated by imaging the celestial object and image non-celestial objects in the vehicle environment to geographically locate the non-celestial objects. In-flight calibrating the imaging device can include pointing the imaging device toward the celestial scene having the celestial object. Determining position of the object in vehicle environment can include pointing the imaging device toward a non-celestial object in the vehicle environment. The in-flight calibration of the imaging device pointing can be replaced with the ground-based calibration of the imaging device pointing.

A system for determining position of an object relative to a vehicle includes an imaging device and an imaging processor. The controller is operably connected to the imaging device and is responsive to instructions recorded on a non-transitory machine-readable memory to image a scene having a celestial object with the imaging device, determine difference between an expected position of the celestial object and an actual position of the celestial object in the imaged scene, and in-flight calibrate imaging device pointing to improve position determining by nulling difference between the expected position of the celestial object and the actual position of the celestial object in the scene.

In certain embodiments the imaging device can be supported by an airborne vehicle, a terrestrial vehicle, or a marine vehicle. The imaging device can be fixed relative to one or more gimbals. The imaging device can include a camera responsive to visible or infrared illumination to image a scene. The imaging device can be incorporated in an intelligence, surveillance, and reconnaissance (ISR) device. The imaging device can be carried by an aircraft. The imaging device can be response to visible or infrared illumination to generate an image of the scene.

In accordance with certain embodiments, the controller can be responsive to instructions to alternately in-flight calibrate the imaging device and geographically locate objects in the vehicle environment. The controller can replace the in-flight calibration of the imaging device pointing with ground-based calibration of the imaging device pointing. The controller can cause the imaging device to image a non-celestial object with the imaging device, determine geographical position of a non-celestial object based on in-flight calibration of the imaging device pointing, and associate a position of the non-celestial object using imaging device pointing.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
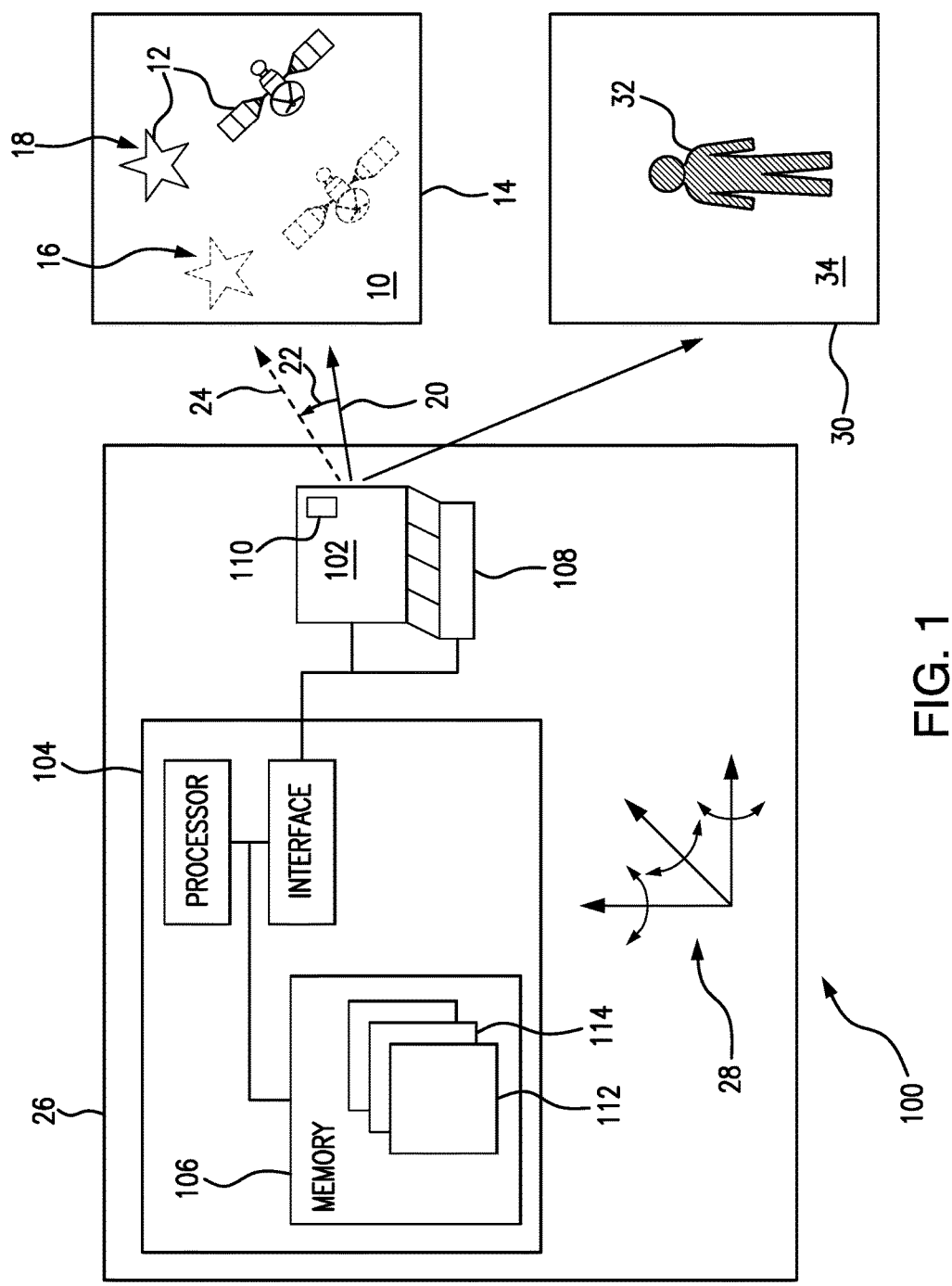
FIG. 1 is a block diagram of an exemplary embodiment of a system for determining position of an object relative to a vehicle constructed in accordance with the present disclosure, showing an imaging device carried by an airborne vehicle imaging scenes having celestial and non-celestial objects.

Reference will now be made to the drawings wherein like reference numerals identify similar structural features or aspects of the subject disclosure. For purposes of explanation and illustration, and not limitation, a partial view of an exemplary embodiment of a system for determining position of an object relative to a vehicle in accordance with the disclosure is shown in FIG. 1 and is designated generally by reference character 100. Other embodiments of systems for determining position of an object relative to a vehicle and methods for determining position of an object relative to a vehicle in accordance with the disclosure, or aspects thereof, are provided in FIG. 2, as will be described. The systems and methods described herein can be used for determining position of object relative to a vehicle, such as locating targets relative to aircraft, thought the present disclosure is not limited to target locating or to aircraft in general.

Referring to FIG. 1, system 100 is shown. System 100 includes an imaging device 102 and a controller 104. Controller 104 is operably connected to imaging device 102 and is responsive to instructions recorded on a non-transitory machine-readable memory 106 to image a scene 10 having a celestial object 12 using imaging device 102. Imaging device 102 is responsive to incident electromagnetic radiation, e.g., visible illumination or infrared illumination, to generate an image 14 of scene 10 including one or more celestial object 12, e.g., a star and an artificial satellite. Celestial object 12 can be a natural satellite or star. Celestial object 12 can be an artificial satellite. As will be appreciated by those of skill in the art in view of the present disclosure, use of a natural satellite or star can be more accurate than use of an artificial satellite.

Using image 14, controller 104 determines difference between an expected position 16 of celestial object 12 and an actual position 18 of celestial object 12 in scene 10. Controller 104 further in-flight calibrates pointing 20 of imaging device 102 by nulling a difference 22 between expected position 16 of celestial object 12 and actual position 18 of celestial object 12 in scene 10. The in-flight calibration provides imaging device 100 with calibrated pointing 24, matching expected position 16 and actual position 18 of celestial object 12 in subsequent images acquired of celestial scenes, e.g., subsequent images of scene 10. As will appreciated by those of skill in the art in view of the present disclosure, in-flight calibrating pointing of imaging device 102 can improve position determinations made thereafter by removing accumulated error in pointing knowledge of imaging device 102.

System 100 is supported (i.e. carried) by a vehicle 26. Vehicle 26 can be a non-terrestrial vehicle, such as an aircraft or artificial satellite. Vehicle 26 can be a terrestrial vehicle, such as an automobile or truck. Vehicle 26 can be a ship or a submarine. In certain embodiments imaging system 100 can be incorporated into an imaging, surveillance, and reconnaissance (ISR) device, e.g., targeting pod for a military aircraft. Examples of suitable ISR devices include MS-177 or SYERS ISR devices, available from United Technologies Aerospace Systems of Charlotte, N.C.

In the illustrated exemplary embodiment system 100 is coupled to vehicle 26 by one or more gimbals 108. Controller 104 is operably connected to the one or more gimbals 108 to move imaging (orient) imaging device 102 relative to vehicle 26 according to one or more degree of freedom 28, thereby changing pointing of imaging device 102. It is to be understood and appreciated that this is for illustration purposes only; in certain embodiments imaging device 102 can have a strapped down arrangement, pointing of imaging device 102 being selected by change of one or more of attitude, pitch, and/or yaw of vehicle 26.

Imaging device 102 includes a camera 110. Camera 110 is responsive to incident electromagnetic radiation to generate images of scenes, e.g., scene 10. In certain embodiments camera 110 includes a focal plane detector (FPD) responsive to electromagnetic radiation to generate images of scene 10. For example, the FPD can be responsive to electromagnetic radiation within the visible waveband to generate images, e.g., image 14, of scene 10. The FPD can be responsive to electromagnetic radiation within the infrared waveband to generate images, e.g., image 14, of scene 10. The FPD can be responsive to electromagnetic radiation from within one or subdivision of the electromagnetic spectrum, e.g., in a near-infrared (NIR), shortwave-infrared (SWIR), mid-wave infrared (MWIR), and/or a long-wave infrared (LWIR). As will be appreciated by those of skill in the art in view of the present disclosure, different wavelengths of electromagnetic radiation provide different information about a given object, visible waveband illumination generally being used for image 14 and a selected infrared waveband subdivision being suited for scenes with non-celestial objects, e.g., a scene 30 with a non-celestial object 32.

System 100 has a ground-based calibration 112 and an imaging device in-flight calibration 114. Ground-based calibration 112 is a 'factory calibration' of imaging device pointing. Ground-based calibration 112 may be an as-built set up of imaging device 102 established during testing and qualification of imaging device 102. It is contemplated that ground-based calibration 112 can be established diagnostically, such as following installation and/or repair events. In either scenario, ground-based calibration 112 is established prior to employment of the imaging device during imaging of non-celestial object 32.

In-flight calibration 114 is established while vehicle 26 is in-flight. In this respect controller 104 is arranged to alternately in-flight calibrate Imaging device 102 by imaging scene 10 and thereafter image scene 34 having non-celestial object 32. Imaging of scene 34, which can be same scene used for calibration or which can be a different scene, occurs subsequent to controller 104 replacing ground-based calibration 112 with in-flight calibration 114. In this respect imaging system 100 employs imaging device as a star tracker. As will be appreciated by those of skill in the art in view of the present disclosure, star trackers can employ cameras to very accurately determine attitude, e.g., on the order of about one (1) arc-second to about thirty arc-seconds.

Applicant has come to appreciate that, by pointing imaging device 102 to celestial objects stars during flight, determining the between actual (observed or known position) and an estimate determined by system 100, and nulling the difference, the pointing (line of sight) of imaging device 102 will be calibrated to the known position of the celestial object. This provides real-time in-flight calibration of pointing of imaging device 102, rendering pointing knowledge of imaging device 102 less (if at all) susceptible to the degradation that ground-based calibrations can otherwise be susceptible due to flight conditions.

Instead, by calibrating imaging device 102 in-flight (i.e. during flight), there is essentially no error in the line-of-sight of imaging device 102 since calibration is effectively coincident with imaging non-celestial objects. In certain embodiments, e.g., imaging devices having a relatively small instantaneous field of view and a large aperture, high signal-to-noise images can be acquired during calibration despite sky brightness from sun scatter, allowing imaging device 102 to be calibrated during both daylight and nighttime illumination conditions. As will also be appreciated by those of skill in view of the present disclosure, in-flight calibrating pointing of imaging device 102 improves the ability to locate non-celestial objects at long slant ranges by freeing an accuracy budget for the effects of atmospheric refraction, which can become significant a distances beyond that otherwise limited by the horizon to a surface observer.

Figure 2:
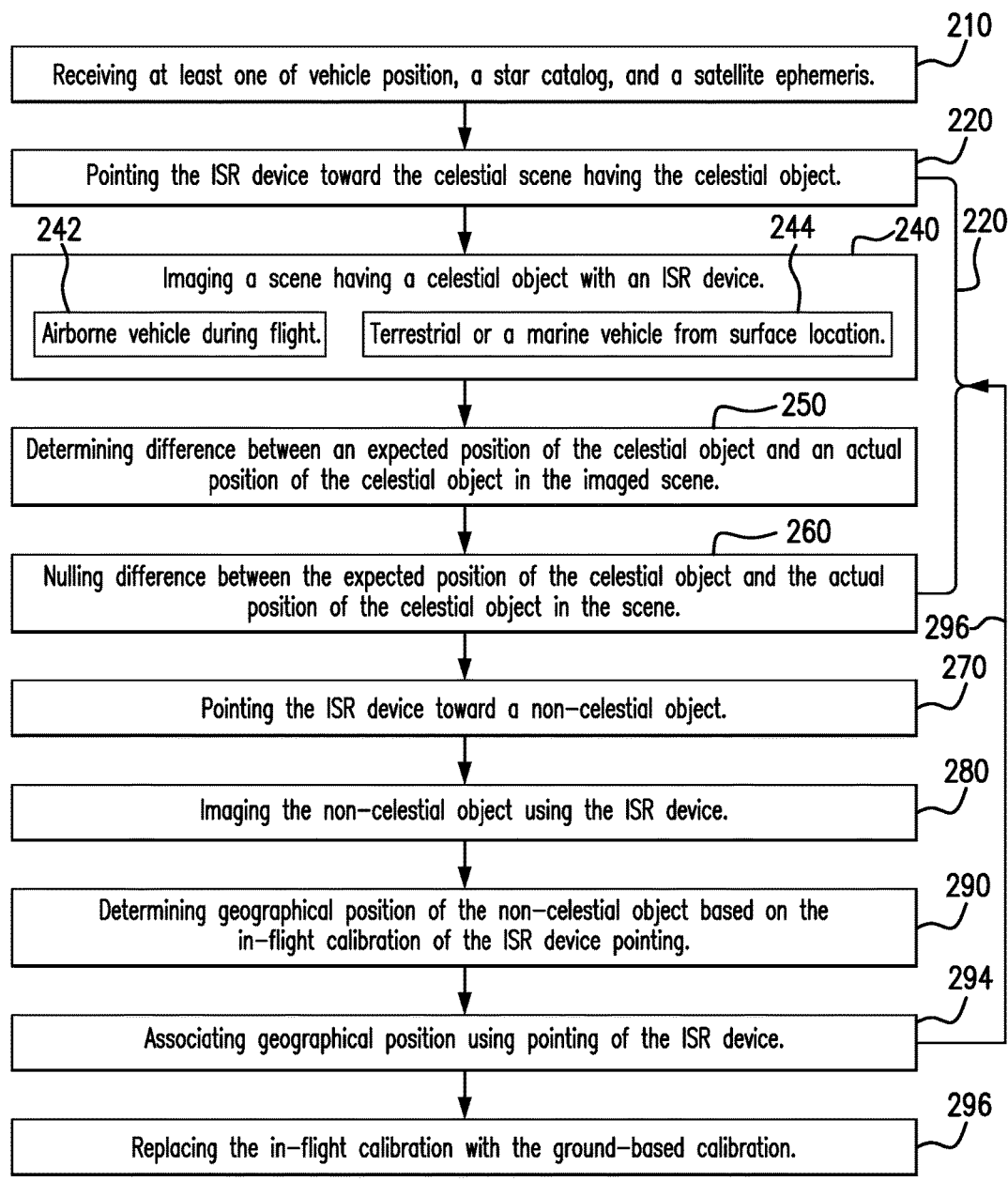
FIG. 2 is a flow chart of a method for determining position of an object relative to a vehicle, showing the imaging device being in-flight calibrated prior to acquiring imagery of the scene having a non-celestial object.

Referring to FIG. 2, a method 200 of determining position of an object relative to a vehicle is shown. Method 200 includes receiving two or more of a vehicle position, a star catalog, and/or a satellite ephemeris, as shown with box 210. The imaging device, e.g., imaging device 102 (shown in FIG. 1), is in-flight calibrated, as shown with bracket 220. It is contemplated that the in-flight calibration be done coincident with operational imaging to improve the accuracy of imaging device pointing toward a scene to be imaged, e.g., scene 34 (shown in FIG. 1), and positional information of non-celestial objects identified in images acquired between in-flight calibration events. As used herein, positional information refers to location of air/space-borne objects as well as terrestrial objects relative to a frame of reference, e.g., imaging device 102 or the earth.

In-flight calibrating 220 imaging device 102 includes pointing the imaging device towards a celestial scene, e.g., celestial scene 10 (shown in FIG. 1), having one or more celestial objects, e.g., celestial object 12 (shown in FIG. 1), as shown with box 230. The scene including the celestial object is imaged by the imaging device, as shown with box 240. It is contemplated that the imaging of the celestial object be done from the airborne vehicle while in flight, as shown with box 242, though it is also contemplated that the imaging can be done from a terrestrial or marine vehicle located at the surface of the earth as shown with box 244.

Using an image, e.g., image 14 (shown in FIG. 1), of the celestial scene a difference between an expected position, e.g., expected position 16 (shown in FIG. 1), of the celestial object and an actual position, e.g., actual position 18 (shown in FIG. 1), of the celestial object in the imaged scene is determined, as shown with box 250. Difference can be calculated by determining the expected position of the celestial body according to the received star catalog and/or through a satellite ephemeris, as appropriate under the imaging conditions. For example, the difference between the expected location of the celestial body and the actual location of the celestial body can be nulled to establish an in-flight calibration of the imaging device, as shown with box 260. In-flight calibrating the imaging device can include replacing a pre-existing ground-based calibration of the imaging device, e.g., ground-based calibration 112 (shown in FIG. 1), with the difference, e.g., difference 22 (shown in FIG. 1). It is also contemplated that the ground-based calibration can be modified, e.g., by adding or subtracting difference 22 form the corresponding ground-based calibration, as appropriate for a given application.

Once in-flight calibration of the imaging device is accomplished, operational imaging can begin (or continue). In this respect the imaging device is pointed toward an object of interest, such as toward a non-celestial object, e.g., non-celestial object 32 (shown in FIG. 1), as shown with box 270. The scene, e.g., scene 34 (shown in FIG. 1), is then imaged with the imaging device, as shown with box 280, and the location of the non-celestial object determined based on the in-flight calibration of the Imaging device pointing, as shown with box 290. It is contemplated that location be determined from pointing of the imaging device and the associated in-flight calibration of the imaging device pointing, as shown with box 292. In certain embodiments (1) the height above the earth geoid is known for the target, or (2) a plurality of images can be acquired for purpose of triangulation when height above the earth geoid is not known for the target. It is also contemplated that imaging and in-flight calibration be alternately performed with operational imaging during flight, as shown with arrow 294, thereby maintaining the accuracy of the pointing of the imaging device and thereby maintaining pointing knowledge. Alternatively, in-flight calibration can be opportunity based or pre-planned into the profile of the mission according to operational needs. At the end of the mission the in-flight calibration of the imaging device pointing can be replaced with the ground-based calibration of the imaging device pointing, as shown with box 298.

The methods and systems of the present disclosure, as described above and shown in the drawings, provide for imaging systems and methods of determining position of an object using imaging systems with superior properties, including improved pointing knowledge accuracy.

While the apparatus and methods of the subject disclosure have been shown and described with reference to preferred embodiments, those skilled in the art will readily appreciate that change and/or modifications may be made thereto without departing from the scope of the subject disclosure.

What is claimed is:

1. A method of determining object position relative to a vehicle, comprising:
   imaging a celestial object with an imaging device;
   determining difference between an expected position of the celestial object and an actual position of the celestial object in the image;
   calibrating pointing of the imaging device to improve position determining by nulling difference between the expected position of the celestial object and the actual position of the celestial object; and
   determining position of a non-celestial object based on the calibration of the imaging device pointing.

2. The method as recited in claim 1, wherein the vehicle is an airborne vehicle, wherein the imaging is done in-flight.

3. The method as recited in claim 1, wherein the vehicle is a terrestrial or a marine vehicle, wherein imaging is done from a surface location.

4. The method as recited in claim 1, wherein the difference between the expected position and the actual position of the celestial object in the image is an in-flight calibration of imaging device pointing.

5. The method as recited in claim 4, further comprising imaging a non-celestial object with the imaging device, and determining object position using imaging device pointing.

6. The method as recited in claim 4, further comprising replacing the in-flight calibration of the imaging device pointing with a ground-based calibration of the imaging device pointing.

7. The method as recited in claim 1, further comprising receiving at least two of vehicle position, a star catalog, and a satellite ephemeris.

8. The method as recited in claim 1, further comprising alternately in-flight calibrating the imaging device and locating non-celestial objects.

9. The method as recited in claim 8, wherein in-flight calibrating the imaging device includes pointing the imaging device toward the celestial object, wherein geographically locating a non-celestial object in the vehicle environment includes pointing the imaging device toward the non-celestial object.

10. The method as recited in claim 1, wherein the determined position is a geographical position of the non-celestial object.

11. The method as recited in claim 1, wherein the celestial object is a star or an artificial satellite.

12. The system as recited in claim 1, wherein the determined position is a geographical position of the non-celestial object.

13. A system for determining position of an object relative to a vehicle, comprising:
    an imaging device;
    a controller operably connected to the imaging device and responsive to instructions recorded on a non-transitory machine-readable memory to:
        image a celestial object with the imaging device;
        determine difference between an expected position of the celestial object and an actual position of the celestial object in the image;
        calibrate imaging device pointing to improve position determining by nulling difference between the expected position of the celestial object and the actual position of the celestial object, and
        determine position of a non-celestial object based on the calibration of the imaging device pointing.

14. The system as recited in claim 13, wherein the imaging device is supported by an airborne vehicle, a terrestrial vehicle, or a marine vehicle.

15. The system as recited in claim 13, wherein the imaging device is fixed relative to one or more gimbals.

16. The system as recited in claim 13, wherein the controller is further responsive to the instructions to alternately in-flight calibrate the imaging device and geographically locate objects in the vehicle environment.

17. The system as recited in claim 13, wherein the controller is further responsive to the instructions to replace the in-flight calibration of the imaging device pointing with a ground-based calibration of the imaging device pointing.

18. The system as recited in claim 13, wherein the processor is further responsive to the instructions to image a non-celestial object with the imaging device, determine geographical position of a non-celestial object based on in-flight calibration of the imaging device pointing, associate a geographical position of the non-celestial object using imaging device pointing.

19. The system as recited in claim 13, wherein the imaging device includes a camera, responsive to visible or infrared illumination to image the celestial object.

20. The system as recited in claim 13, wherein the calibration is done in-flight.

* * * * *